March 16, 1965    A. B. SKROMME    3,173,693
MATERIAL UNLOADER
Filed Feb. 6, 1964
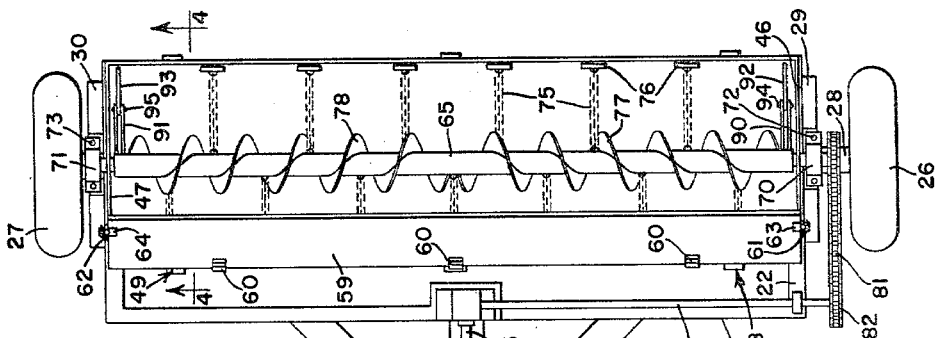
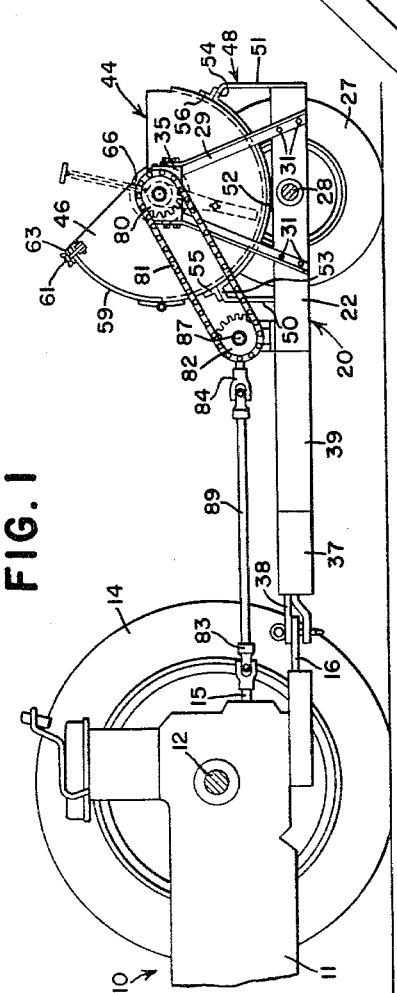
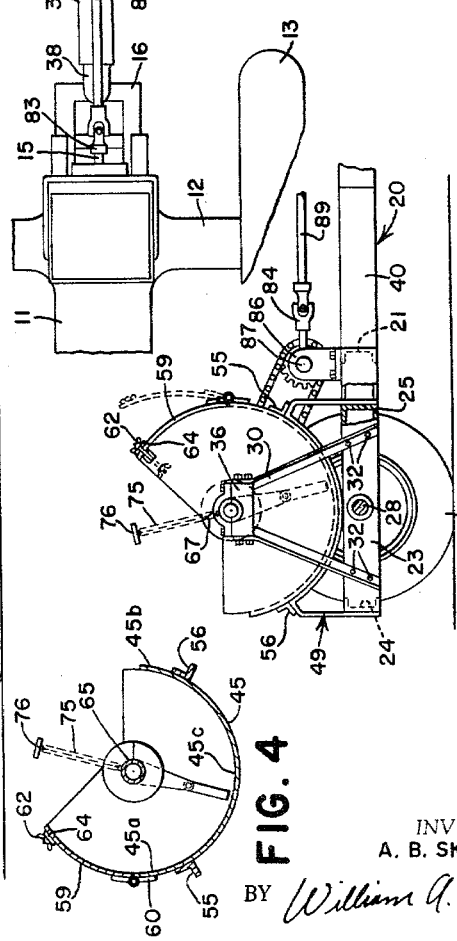
INVENTOR.
A. B. SKROMME
BY William A. Murray
ATTORNEY United States Patent Office 3,173,693
Patented Mar. 16, 1965

3,173,693
MATERIAL UNLOADER
Arnold B. Skromme, Moline, Ill., assignor to Deere & Company, Moline, Ill., a corporation of Delaware
Filed Feb. 6, 1964, Ser. No. 343,099
1 Claim. (Cl. 275—3)

This invention relates to a material unloader of the type having a central elongated shaft disposed between longitudinally extending side walls and having flail members spaced axially along the shaft so that upon rotation of the shaft, the flails will drive the material over one of the side walls. Still more particularly this invention relates to a new and novel structure which causes the material to unload relatively evenly throughout the length of the material unloader.

In U.S. Patent 2,886,333 issued to H. M. Harris May 12, 1959 there is provided a material unloader featuring a transversely disposed elongated tub or material container with a centrally located shaft disposed transversely and between the front and rear walls of the container. Flails are supported on the shaft and extend to the side walls so that upon rotation of the shaft, material will be discharged over the rear wall of the container. This type of material unloader is primarily used in unloading manure onto a field.

It has been found in practical operation that a material unloader of the type described in the H. M. Harris patent has certain problems in that the unit does not track properly behind a tractor and also there are pulsations or vibrations occurring due to the uneven discharge of material. These problems are created primarily due to the fact that the flexible elements or flails normally will wrap about the shaft upon initial movement or rotation of the shaft and will then tend to expand away from the shaft as the shaft continues to rotate. This creates a condition in which the flails will break through the material at various times and at various distances from the shaft. Actually, therefore, in operation material will often be discharged at one end of the material unloader followed by intermittent breaking through of the flexible elements at other portions of the shaft. This creates vibration in the implement as well as tending to prevent proper tracking of the implement relative to the tractor pulling the implement.

It is proposed and it is the main object of the present invention to correct the above problem by providing on the shaft a pair of augers extending from a central portion of the container to the outer ends of the container and having different spirals so that material adjacent the shaft will be moved outwardly to opposite ends of the container. Positioned adjacent the ends is a pair of solid flails or arms pivotally connected at their inner ends to the shaft so that the material received from the auger and at the ends will initially discharge at the same time and substantially in equal amounts from both ends of the container. Also, the fact that the flails are solid creates a condition in which there is weight at the ends of the shaft which gives a flywheel effect at opposite ends of the shaft. Consequently in actual operation the material is initially discharged at both ends of the material container and the other flexible elements, spaced lengthwise and around the shaft, break through the material at substantially uniform times and the entire unloader has a reduced amount of vibrations due to the imbalance created by non-uniform discharge.

Other objects and advantages of the present invention will become apparent to those skilled in the art as the nature of the invention is better understood from the following description and as shown in the accompanying drawings.

FIG. 1 is a side elevation of the material unloading implement and tractor combination, with only the rear portion of the tractor being shown. The left rear wheel of the tractor and the left wheel of the implement is removed for purposes of clarity.

FIG. 2 is a plan view of the assembly shown in FIG. 1.

FIG. 3 is a side elevation of the right end of the implement with the right wheel and other parts removed for purposes of clarity.

FIG. 4 is a sectional view taken along lines 4—4 of FIG. 1 showing an operating condition of the unloading mechanism.

Referring now to FIG. 1, the tractor 10 is of conventional form having an elongated tractor body 11 supported at its forward end by front steerable wheels, not shown, and at its rear on transverse axle means 12 and transversely spaced apart traction wheels 13, 14. The tractor also includes a conventional power take-off shaft 15 and a drawbar 16 fixed to the underside of the tractor body 11 and projecting rearwardly.

A material unloading vehicle here shown for illustration purposes as a manure spreader includes an elongated main frame 20 having a front transverse member 21 and a pair of rearwardly extending channel members 22, 23 at opposite ends of the front transverse channel member 21, and a rear transverse channel member 24. A third transverse channel member 25 also extends between the side channel members 22, 23 and is positioned rearwardly of but proximate to the front channel member 21. The rigid frame 20 is carried on a pair of transversely spaced wheels 26, 27 by means of an axle 28 journaled at opposite ends on the side channel members 22, 23. At opposite ends of the main frame 20 are a pair of upright A-frames 29, 30 which are bolted as at 31, 32 respectively to the side channel members 22, 23. The upper end of the A-frame 29, 30 support bearing blocks 35, 36 respectively.

The main frame 20 is also supported forwardly by the tractor drawbar 16 through means of a forwardly extending rigid frame member 37 fixed to and extending forwardly from the front transverse channel member 21. The forward end of the frame member 37 is connected to the drawbars 16 by means of a conventional type clevis 38. A pair of struts 39, 40 converge forwardly from transversely spaced portions of the front channel member 21 and are rigidly fixed to the fore-and-aft frame member 37.

A material container 44 has a central elongated body portion 45 of semi-circular or U-shaped cross section which extends between opposite ends 22, 23 of the main frame 20. The body portion 45, as mentioned, may be treated as having a U-shaped cross section including fore-and-aft spaced apart sides or walls 45a, 45b interconnected by a bottom or lower wall portion 45c. At opposite ends of the central body portion 45 are upright fore-and-aft extending end walls 46, 47. Each of the end plates 46, 47 are of circular shape with the upper rear portions removed. The container 44 may therefore be treated as a partial cylindrical body enclosed at both ends for holding material.

The container 44 is supported on the main frame 20 by means of transversely spaced apart bracket structures 48, 49 which fit under the container 44. Referring first to the bracket structure 48, the structure includes a pair of vertical fore-and-aft spaced apart legs 50, 51 fixed to the transverse channel members 25, 24, respectively. The upright portions 50, 51 are interconnected by a fore-and-aft extending portion 52 having an upper surface congruent with the outer surface of the container body 44. The bracket 48 is also shaped to provide a pair of abutments 53, 54 the purpose of which will later become apparent. The bracket structure 49 at the right end of the unit is identical to the bracket structure 48 and detailed disclosure is deemed not necessary.

The container 44 is supported on the bracket structures 48, 49 merely by cradling the lower surface of the body 45 on the curved portions of the bracket structures. Angle iron members 55, 56 are welded to the container 44 and operate to engage the abutments such as at 53, 54 to maintain the container 44 in proper angular alinement on the frame 20. The front wall 45a is extended above the rear wall by means of a wall extension or shield 59. The shield 59 is formed to a partial cylindrical shape and serves when in its operating position to guide materials or manure over the rear wall 45b and also to prevent materials from moving forwardly over the front wall. The shield 59 is hinged, as at 60, to the front wall 45a and may be swung forwardly, as indicated in dotted representation in FIG. 3, to enable loading of the container. Outwardly extending brackets 63, 64 are fixed to opposite ends of the shield 59 and are slotted to receive latches 61, 62 on the end walls 46, 47 respectively.

A transverse shaft 65 extends the length of the container 44 and extends through the respective wall sections 46, 47 by means of openings or slots 66, 67 which are inclined rearwardly from the upper edges of the walls. Relative to the end plate 47, the slot is provided to permit removal of the shaft 65. Opposite ends of the shaft 65 are journaled in bearings supported by the bearing blocks 35, 36 respectively. Bearing caps 70, 71, are bolted as at 72, 73, to the blocks 35, 36 and operate to secure the shaft 65 to the implement frame. The shaft 65 may, of course, be removed independently of the container by removing the caps 70, 71 and raising the shaft 65 from the slots 66, 67.

Flexible arm elements herein the form of link chains 75 are fixed in axially spaced relation on the shaft 65. The outer end of the chains 75 are characterized by having a drag member 76 composed in the present instance of a pair of crossed rods which, as will later be explained, drag through the material for purposes of removing the material from the container. The chains 75 and drags 76 are of such length to be substantially equal to the distance between the shaft 65 and the nearest portion of the container body 45. Since the container 45 is cylindrical, the chain and drag are substantially equal to the radius of the cylinder wall.

A pair of opposite hand spirals or augers 77, 78 is fixed on the surface of the shaft 65 and extend from inner ends adjacent the fore-and-aft center line of the implement to outer ends adjacent the walls 46, 47. Adjacent the outer ends of the spirals or augers 77, 78 are a pair of rigid radial arms 90, 91 rigid with the shaft 65 and extending outwardly therefrom. The outer ends of the arms 90, 91 pivotally carry on pins 94, 95 outwardly projecting flail members 92, 93. The flails 92, 93 are relatively heavy, being composed of iron blades and will consequently cut through material adjacent the end walls 46, 47 relatively easily upon rotation of the shaft 65.

Drive mechanism for the shaft 65 is provided at the left end of the implement and includes a sprocket 80 fixed to the outer end of the shaft 65 and a chain 81 which feeds forwardly to a pinion sprocket 82. The shaft drive is driven from the power take-off shaft 15 by means of a pair of fore-and-aft spaced apart universal joints 83, 84 interconnected through a fore-and-aft extending shaft 89, the forward universal joint 83 being connected to the power take-off shaft 15 and the rear universal joint 84 being connected to a gear drive shaft 85 which projects forwardly from a gear housing 86. Enclosed in the gear housing 86 is a pair of meshed beveled gears which drive a transverse drive shaft 87 on which is mounted the pinion sprocket 82.

The manure spreader operates in the following manner. Either the container itself will be moved to a position to collect manure or other such type of material and then placed on the frame, or the entire implement may be so positioned. The mode of loading the manure spreader is unimportant other than to realize that normally the hood 59 will be either removed or moved to its down position to permit the maximum opening at the top of the container. While loading, the chains 75 will be in a depending position and the material loaded in the spreader will normally hold the links in that position until the shaft 65 is caused to rotate.

Initial rotation of the shaft 65 will cause the chains 75 to wrap about the shaft 65 and within the cylindrical opening formed by the augers 77, 78. Consequently, upon initial rotation of the shaft, there will be little if any discharge of material over the rear side 45b of the material container. The flail arms 92, 93 being relatively heavy, will cause the flails to cut through the material and initiate discharge of material at both the ends of the material container. Material will be fed to the ends or to the flail arms 90–93 by the respective augers 77, 78. Consequently, there will not be the breaking away of material on one side of the material unloader as often occurs in the structure shown in the Harris patent. However, once the blades 92, 93 cut a path in the material, the implement will begin discharging material at opposite ends of the container. Also, the augers 77, 78 will clear a cylindrical opening in the center of the material unloader so that the chains 75 and their drags 76 are started in their rotation under substantially the same characteristics. Therefore, due to the action of the augers 77, 78, the material will tend to be discharged throughout the length of the container and substantially at the same time. Under these circumstances, it is considered that the tendency for the implement to vibrate due to discharge of material at only one side, or for the implement to track poorly relative to its tractor, is minimized if not in most instances eliminated.

While only one form of the invention has been shown, it should be recognized that other forms and variations will occur to those skilled in the art. Therefore, while the preferred form is shown for the purpose of clearly and concisely illustrating the principles of the invention, it is not intended to limit or narrow the invention beyond the broad concepts set forth in the appended claim.

What is claimed is:

A forwardly movable material unloader including a main frame; transversely spaced support wheels for the frame; an elongated transversely extending material container mounted on the frame and including a bottom and front and rear upright side walls and opposite end walls extending upwardly from the bottom; a transverse rotor shaft extending between the end walls and parallel to the side walls and bottom; a pair of helicoids of opposite hands supported on the shaft extending from inner ends adjacent the transverse center of the container to outer ends adjacent the end walls; a plurality of axially spaced flexible elements supported on the shaft; a pair of identical flail devices on the respective ends of the shaft closely adjacent the respective end walls, each including a rigid radial arm rigid with the shaft and an outer rigid flail member pivoted on the outer end of the arm, said flail devices being relatively heavy as compared to the flexible elements whereby they will initiate discharge of material at the ends of the container upon rotation of the shaft; and means for rotating the shaft for effecting discharge of material over the rear side wall and for augering material by the helicoids to the respective flail devices on the ends of the shaft.

References Cited by the Examiner
UNITED STATES PATENTS

| | | | |
|---|---|---|---|
| 1,177,391 | 3/16 | Davis | 275—3 |
| 2,886,332 | 5/59 | Elwick | 275—3 |
| 2,886,333 | 5/59 | Harris | 275—3 |
| 3,048,409 | 8/62 | Elwick | 275—3 |

ABRAHAM G. STONE, *Primary Examiner.*

WILLIAM A. SMITH, III, *Examiner.*